UNITED STATES PATENT OFFICE.

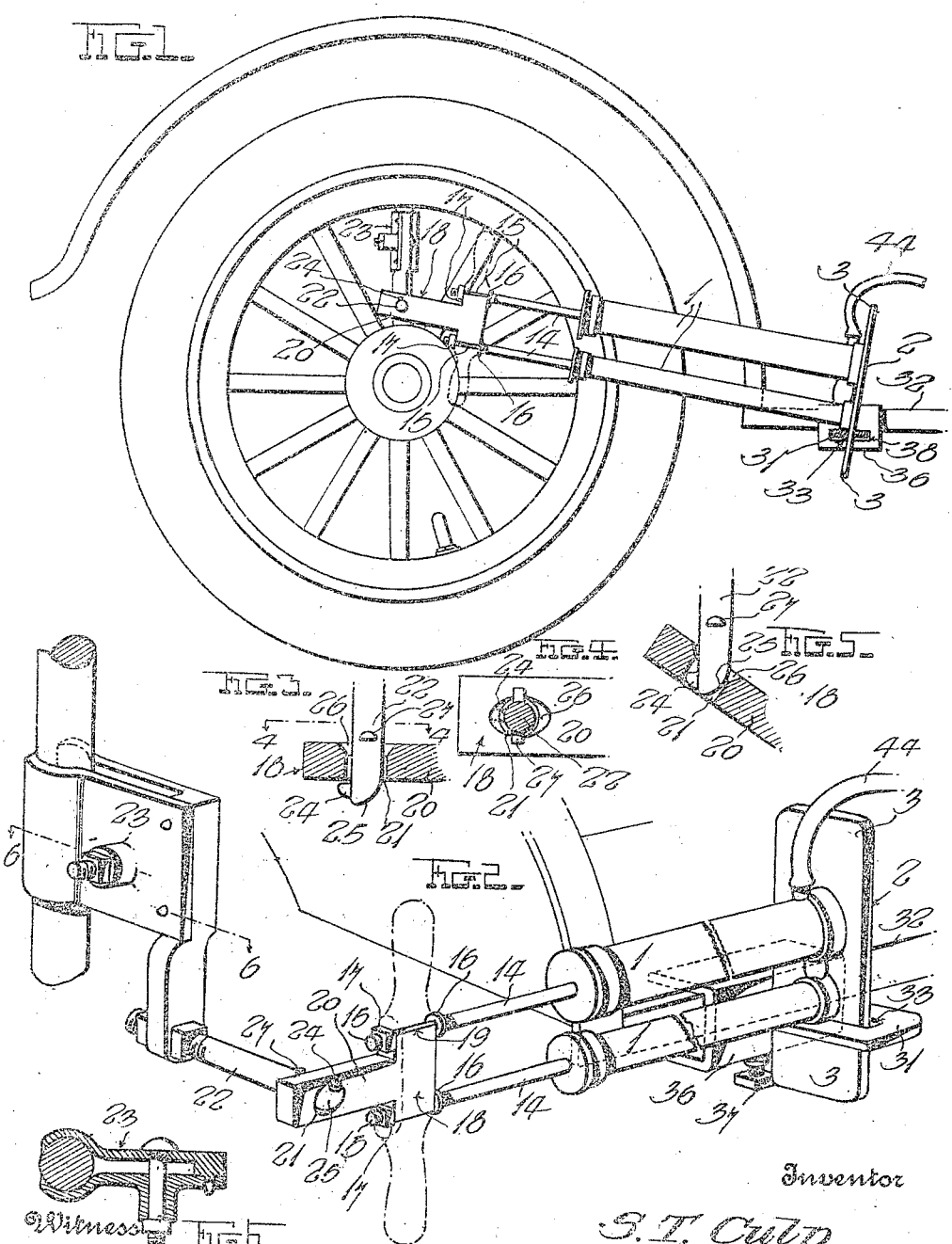

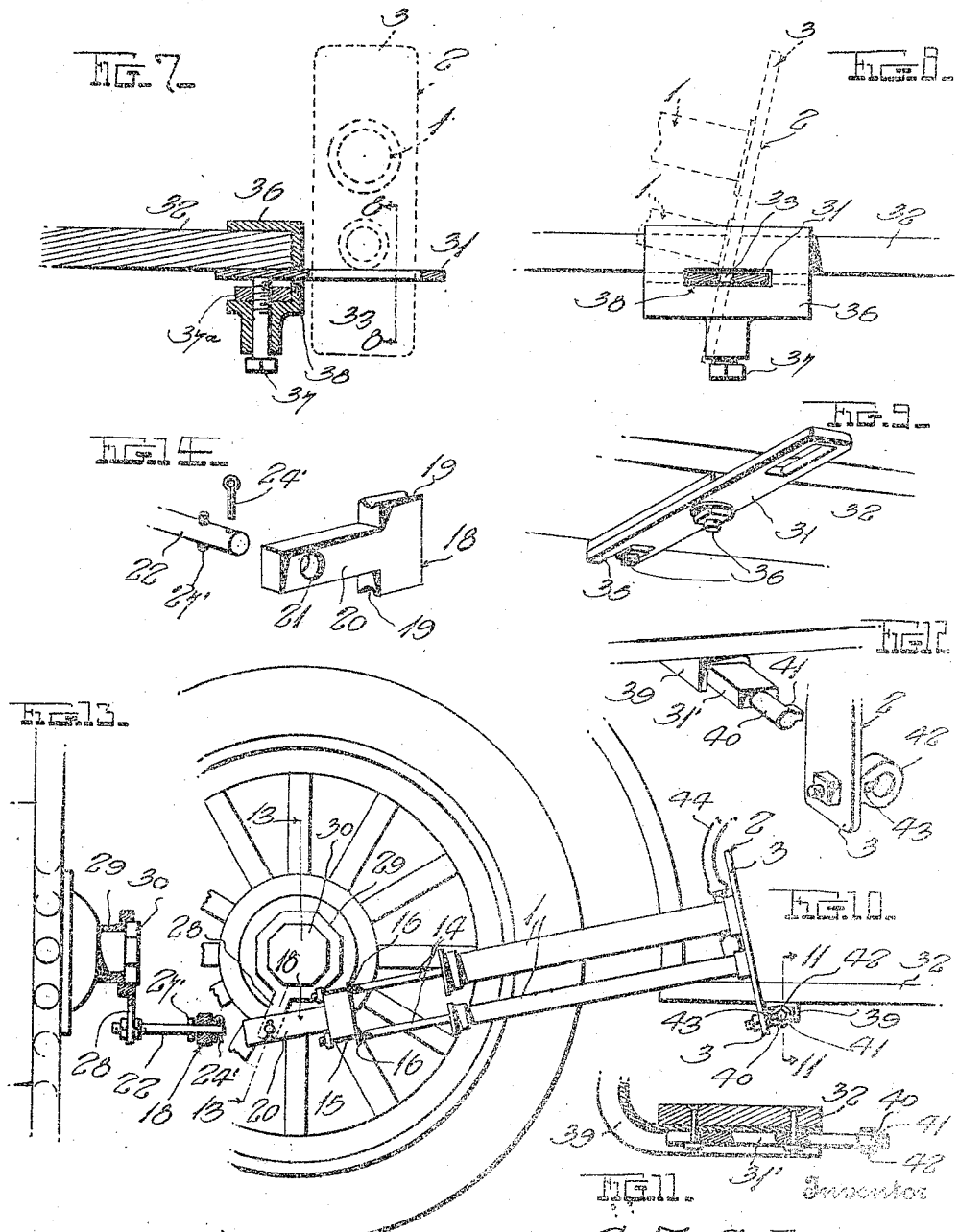

SAMUEL THADDEUS CULP, OF LITTLETON, COLORADO.

AUTOMOBILE-TIRE PUMP.

1,289,064.

Specification of Letters Patent.

Patented Dec. 24, 1918.

Application filed February 18, 1918. Serial No. 217,859.

*To all whom it may concern:*

Be it known that I, SAMUEL T. CULP, a citizen of the United States, residing at Littleton, in the county of Arapahoe and State of Colorado, have invented certain new and useful Improvements in Automobile-Tire Pumps; and I do declare the following to be a full, clear, and exact description of the invention, such as will enable others skilled in the art to which it appertains to make and use the same.

My invention has for its principal object to provide an extremely simple and inexpensive, yet a highly efficient and durable pump for inflating automobile tires, the device being so constructed that it may be easily attached and detached to an automobile in such a manner as to be driven by one of the rear wheels of the latter when such wheel is suitably raised above the ground.

A further object is to so construct the device as to permit a common form of automobile pump to be used in connection with the additional features to be herein described, thus making it necessary in a great number of cases for the automobile owner to purchase only a number of attachments for converting his foot pump into a power driven pump.

With the foregoing general objects in view, the invention resides in the novel features of construction and unique combinations of parts to be hereinafter fully described and claimed, the descriptive matter being supplemented by the accompanying drawings which form a part of this specification and in which:

Figure 1 is a side elevation of a portion of an automobile and one form of the invention applied thereto;

Fig. 2 is a perspective view of the pump and its operating and attaching means;

Fig. 3 is a detail horizontal section through the detachable connection between the crank pin and the T-shaped block carried by the pump piston rods;

Fig. 4 is a vertical section on the plane of the line 4—4 of Fig. 3;

Fig. 5 is a view similar to Fig. 3 but illustrating the manner in which the aforesaid head may be detached from and attached to the crank pin by suitably angling the two;

Fig. 6 is a detail section of the spoke clamp on the plane of the line 6—6 of Fig. 2;

Fig. 7 is a vertical section of the clamp employed for securing the slotted arm by which the pump is pivotally mounted, to the running board of the automobile;

Fig. 8 is a vertical section on the plane of the line 8—8 of Fig. 7;

Fig. 9 is a perspective view showing the different manner of attaching the slotted arm to the running board;

Fig. 10 is a view similar to Fig. 1 showing a different method of connecting the piston rods with the rear wheel and also illustrating a different pivotal connection between the pump and the running board;

Fig. 11 is a vertical transverse section on the plane of the line 11—11 of Fig. 10;

Fig. 12 is a disconnected perspective view of the pivotal connection shown in Figs. 10 and 11;

Fig. 13 is a vertical section on the plane of the line 13—13 of Fig. 10 showing the connection between the crank pin and the T-shaped head of the piston rods as illustrating the different mounting of said pin upon the wheel; and Fig. 14 is a detail perspective view showing the connection between the crank pin and head in a more clear manner than illustrated in Figs. 10 and 13.

In the drawings above briefly described, the numerals 1 designate the parallel cylinders of a common form of foot pump, one end of said cylinders being rigidly secured to a transverse foot plate 2 which extends laterally from said cylinders as shown at 3. The opposite ends of the cylinders 1 are provided with the usual projecting piston rods 14 having threaded terminals 15, collars or other suitable shoulders 16 at the inner ends of said terminals, and nuts 17 at the outer ends thereof. The handle shown in dotted lines in the drawings is commonly clamped in place upon the rods 14 by the nuts 17 and collars 16, but in the present invention, this handle is removed and a T-shaped extension member or block 18 is substituted therefor, the head of said block being positioned between the terminals 15 and provided in its ends with grooves or the like 19 receiving said terminals, said head being rigidly clamped between the collars 16 and the nuts 17 as will be clear from the several views. The shank 20 of the block 18, which shank forms an extension arm extending from the piston rods 14, is formed with an opening 21 to receive a crank pin 22.

In Figs. 1 to 5, the crank pin 22 is provided at its inner end with any preferred type of clamp 23 for securing it to one of the spokes of a rear wheel of the automobile, at an eccentric point. The outer end of the pin in question is provided with a lateral projection 24 and the side of the pin opposite said projection is rounded off at its end as shown at 25. These features are adapted to permit the pin to pass through the opening 21 of the arm 20 when the two are located at a suitable angle such as seen in Fig. 5, and in order that the proper operation shall take place, the inner end of said opening 21 merges into elliptical shape as seen at 26. By this construction, the pin 22 and the arm or shank 20 may be quickly and easily connected when necessary for use. Similarly, they can be disconnected easily for storing the pump in the car.

Any preferred means such as a pair of laterally projecting studs 27 may be provided for preventing excessive inward movement of the arm 20 upon the crank pin 22.

In the form of the invention shown in Figs. 10, 13 and 14, the opening 21 may be circular throughout its length since pin 23, although being provided with lateral pins or the like 27' to limit the inward movement of the arm, is provided with a cotter pin 24' for preventing or permitting removal of the arm. In the figures last referred to, rather than provide the pin 22 with a clamp such as 23, it is carried by a crank arm 28 extending from a collar 29 which surrounds and is held in place by one of the hub caps 30. This form of attaching means will be used on some makes of machines whereas a clamp such as 23 will be necessary for attaching the invention to machines of other makes.

In the form of the invention shown in Figs. 1 to 9, a flat arm or bar 31 is secured to one of the running boards 32 and extends laterally therefrom, the projecting end of said arm being provided with a longitudinal slot 33 adapted to receive one of the projecting ends 3 of the foot plate 2, in a rather loose manner, so that although the pump will be held against longitudinal shifting, it will be permitted to oscillate as the rotating wheel moves the crank pin 22 on an arcuate path and operates the piston rod 4 to actuate the pump pistons. In Fig. 9, bolts 34 are shown for securing the bar 31 to the running board 32, said bar preferably having a forked inner end 35 which straddles the nut of one of the bolts. This form of attaching means is preferable on some types of machines, but in most cases, I will provide a C clamp 36 (Figs. 1, 2, 7 and 8) for detachably securing arm 31 in place. This clamp is adapted to engage the edge of the running board as shown clearly in Figs. 2 and 7, the upper horizontal arm of the clamp lying upon the upper surface of said board while the lower arm thereof will be spaced below this board and provided with a bolt hole through which clamping bolt 37 passes loosely. The nut 37ª of bolt 37 lies on the lower arm of the clamp and is held against turning by abutting the vertical part of this clamp. The vertical portion of the clamp 36 is formed with a horizontal slot 38 through which the inner end of bar 31 extends to contact with the lower side of the running board, so that tightening of the bolt 37 will rigidly clamp said bar in place to act as a pivotal support for the pump. This form of attaching and supporting means is simple and inexpensive, may be easily attached and detached, yet is highly efficient and durable. If desired, the clamp may remain on the running board and the plate 31 slid inwardly through slot 38, tightening of bolt 37, serving to hold the parts in place.

At the right of Fig. 10 and in Figs. 11 and 12, a different means is shown for pivotally and detachably supporting the foot plate 2 of the pump. In these figures, an arm 31' is shown bolted within one of the channel-shaped running board brackets 39, the outer end of said arm having a projecting journal 40 equipped with a lateral lug 41. Journal 40 is adapted for reception in an eye 42 secured by a bolt or the like to either the upper or lower end of the foot plate 2, and in order that the lug 41 may pass through said eye, the latter is provided with a key-way 43. It is necessary to turn the foot plate 2 until lug 41 will pass through the key-way 43, after which said plate is so turned as to locate the lug and key-way at remote points. It will thus be obvious that the lug will prevent removal of the eye until required.

In operation, the attachment is taken out of the car in which it may normally be carried compactly, and is attached to the machine as illustrated in the drawings. By jacking up the rear wheel and driving it from the engine, the pump will now be operated so that air may be forced through its tube 44 to the tire to be inflated. The inflation may be accomplished in an extremely short time and the pumping attachment may then be quickly and easily detached and again stored in the machine for future use. Since probably the best results are obtained from the several details shown and described, these details are by preference employed, but within the scope of the invention as claimed, numerous minor changes may well be made.

Particular emphasis is laid upon the fact that a common type of foot pump is used. In the form of the invention illustrated in Figs. 1 to 9, no alteration whatever is necessary to the usual pump structure, since the foot plate 2 thereof is receivable in the slot 33 of arm 31 and the extension member 18 clamps upon the piston rods 4 in place of the usual handle. When employing the eye 42, it is of course necessary to drill a hole in the foot plate, but even this alteration is slight.

I claim:

1. In an automobile tire inflating device, the combination with a foot pump including a pair of parallel piston rods having threaded terminals, shoulders at the inner ends of said terminals, and nuts at the outer ends thereof; of a T-shaped block having its head disposed between said terminals and provided with grooves at its ends receiving them, said head being clamped between said shoulders and said nuts, the shank of said block extending from the ends of said rods and having an opening, a crank pin in said opening, means for securing said crank pin to one of the rear automobile wheels at an eccentric point, and means for pivotally connecting the end of the pump opposite said piston rods to a portion of the automobile.

2. In an automobile tire inflating device, the combination with a foot pump having on one end a projecting piston rod and at its other a laterally extending foot plate; of a horizontal arm upon which the portion of the pump adjacent said foot plate rests, said arm having a slot loosely receiving the projecting part of said foot plate, means for securing said arm to a part of the automobile adjacent one of the rear wheels, and means for detachably and pivotally connecting said piston rod to said wheel at an eccentric point.

3. A structure as specified in claim 2, a securing means for said arm comprising a C-clamp to engage the running board, the vertical portion of said clamp having a slot through which said arm passes to engage the lower side of said running board, the lower end of said C-clamp having means for forcing said arm against said board.

4. In an automobile attachment a block having an opening of circular shape throughout the greater part of its length and then merging into elliptical shape at one end, a crank pin for reception in said opening, one end of said pin having a lateral projection and the side of said pin opposite said projection being rounded off at its end, whereby said pin may pass through said opening when said pin and said enlargment are properly angled, and means for securing said pin to one of the rear wheels of the automobile at an eccentric point.

In testimony whereof I have hereunto set my hand in the presence of two subscribing witnesses.

SAMUEL THADDEUS CULP.

Witnesses:
GEORGE BANCROFT,
ARTHUR F. GODDARD.